United States Patent
Furumoto

(10) Patent No.: US 8,423,949 B2
(45) Date of Patent: Apr. 16, 2013

(54) APPARATUS FOR DISPLAYING A PORTION TO WHICH DESIGN MODIFICATION IS MADE IN DESIGNING A PRODUCT

(75) Inventor: Yukihiko Furumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 12/977,608

(22) Filed: Dec. 23, 2010

(65) Prior Publication Data

US 2011/0167398 A1    Jul. 7, 2011

(30) Foreign Application Priority Data

Jan. 6, 2010   (JP) ................................. 2010-001070

(51) Int. Cl.
*G06F 17/50* (2006.01)
(52) U.S. Cl.
USPC ........... 716/139; 716/100; 716/101; 716/106; 716/136
(58) Field of Classification Search .................. 345/619, 345/418, 519, 680, 679; 700/182; 716/139, 716/100–101, 106, 136; 715/243, 964
See application file for complete search history.

(56) References Cited

U.S. PATENT DOCUMENTS

| | | | | |
|---|---|---|---|---|
| 7,630,870 B2 * | 12/2009 | Chen et al. | ......................... | 703/6 |
| 7,770,142 B1 * | 8/2010 | Shmayovitsh et al. | ....... | 716/109 |
| 7,830,377 B1 * | 11/2010 | Desimone et al. | ............. | 345/420 |
| 7,941,771 B2 * | 5/2011 | Kaszynski et al. | ............. | 716/104 |
| 8,024,691 B2 * | 9/2011 | Zilic et al. | ...................... | 716/132 |
| 2004/0261009 A1 | 12/2004 | Torigoe | | |
| 2006/0146071 A1 * | 7/2006 | Morita et al. | .................. | 345/619 |
| 2006/0250418 A1 * | 11/2006 | Chartier et al. | ................ | 345/619 |
| 2007/0250198 A1 * | 10/2007 | Red et al. | ......................... | 700/97 |
| 2010/0088072 A1 * | 4/2010 | Hayashi et al. | .................. | 703/1 |
| 2010/0138762 A1 * | 6/2010 | Reghetti et al. | ................ | 715/765 |
| 2011/0004857 A1 * | 1/2011 | Hopkins et al. | ................ | 716/104 |

FOREIGN PATENT DOCUMENTS

| | | |
|---|---|---|
| JP | 2004-86851 | 3/2004 |
| JP | 3761156 | 3/2006 |
| JP | 2008-27074 | 2/2008 |

\* cited by examiner

*Primary Examiner* — Stacy Whitmore
(74) *Attorney, Agent, or Firm* — Fujitsu Patent Center

(57) ABSTRACT

The present disclosure is directed to a technique that can be applied to a situation in which a single product is designed by multiple designers using a CAD. During a modification operation of feature data, portions that are referenced to are accumulated in a referenced portion accumulation unit. A portion that has been modified is obtained from new and old feature data, and a determination is made as to whether a reference to the modified portion has been made, based on the information accumulated in the referenced portion accumulation unit. Information about the modified portion that is determined as having been referenced to is displayed on a display.

14 Claims, 17 Drawing Sheets

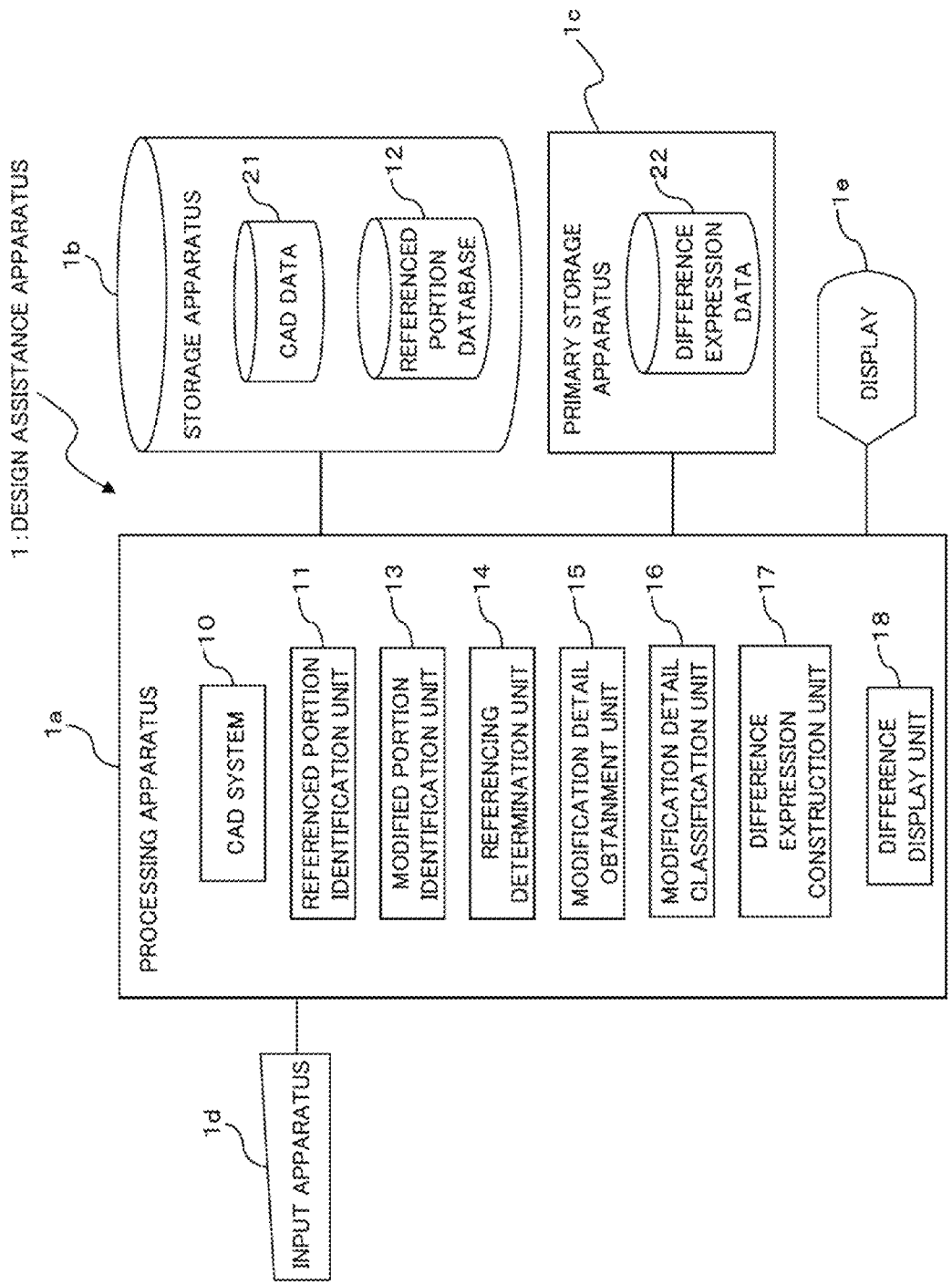

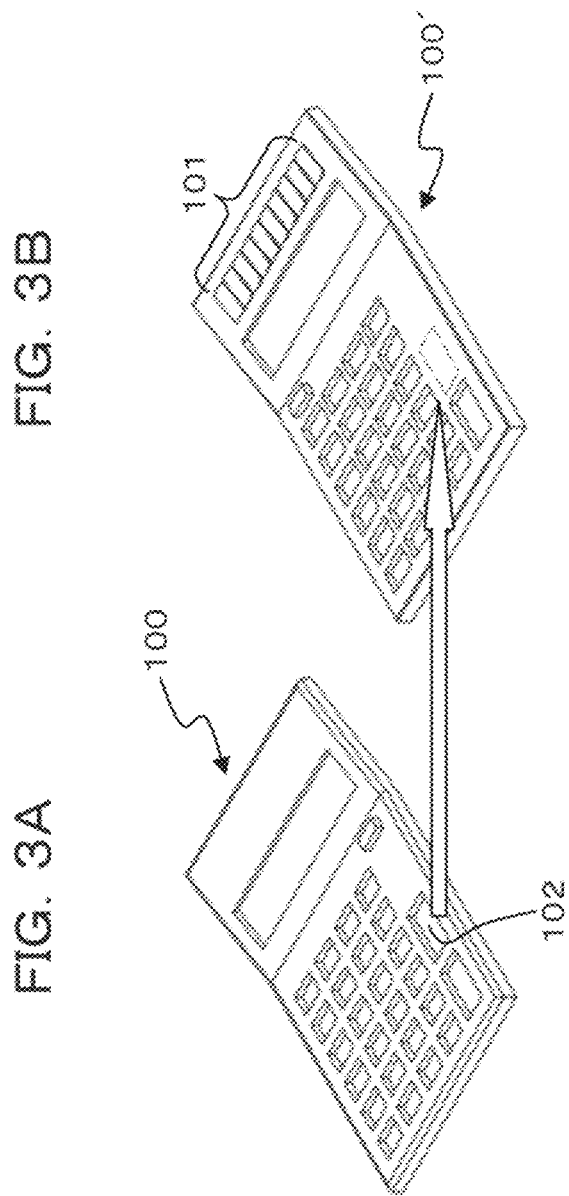

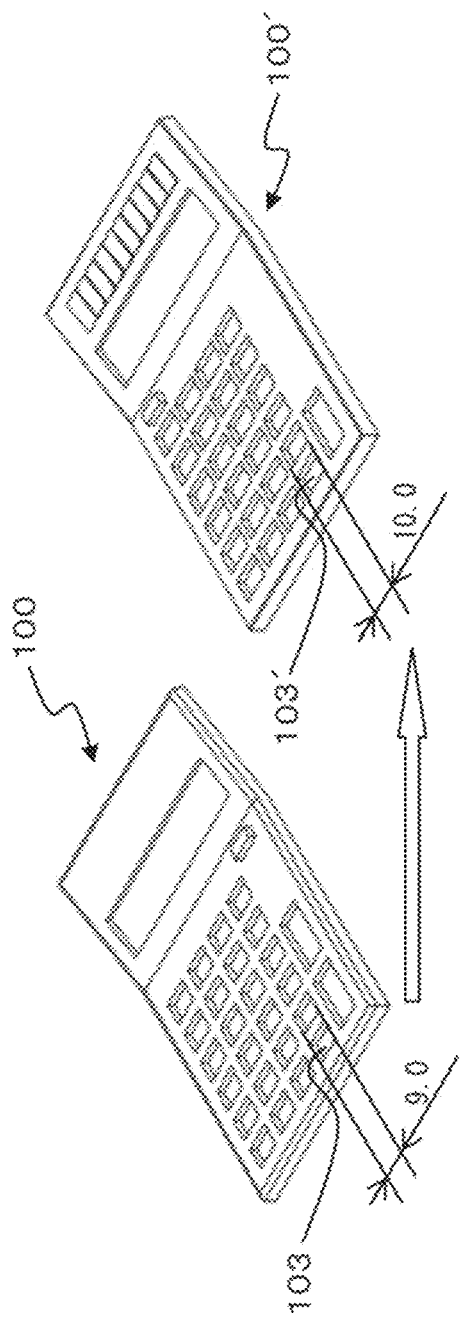

FIG. 7

12: REFERENCED PORTION DATABASE

| USER ID | FILE NAME | PICTURE ELEMENT TYPE | ELEMENT ID |
|---------|-----------|----------------------|------------|
| A | X | FACE | 1 |
| A | Y | EDGE | 3 |
| B | Y | EDGE | 3 |
| A | X | FACE | 2 |
| .. | .. | .. | .. |

APPARATUS FOR DISPLAYING A PORTION TO WHICH DESIGN MODIFICATION IS MADE IN DESIGNING A PRODUCT

CROSS-REFERENCE TO RELATED APPLICATIONS

This application is based upon and claims the benefit of priority of the prior Japanese Patent Application No. 2010-1070, filed on Jan. 6, 2010, the entire contents of which are incorporated herein by reference.

FIELD

The present disclosure relates to a design assistance apparatus and a computer-readable recording medium having a design assistance program stored therein. For example, the present disclosure relates to a technique that can be applicable when a single product is designed by multiple designers using a CAD (computer aided design) system.

BACKGROUND

Product developments in these days have become complicated and the scales have become intensified, and there may be many cases in which a development of a single product may involve multiple designers. At the same time, since advancement of computer networks, notably the Internet, have allowed distribution of product development portions at remote locations, communications of the designers developing the same product have become infrequent.

When a single product is designed by multiple designers, the responsibilities of the designers and the boundaries of the responsibilities are defined in advance. However, often times, the definitions of the boundaries have to be changed because of a variety of factors. When the definitions of the boundaries are changed, a designer have to modify his design portion he is responsible while making reference to other portions modified by other designers.

For example, let's assume a case wherein a product having two parts, namely, an upper portion and a lower portion, is designed by two designers. During design of the upper portion, a portion of a feature in the upper portion requires to go beyond the boundary between the upper portion and the lower portion. In such a case, the designer responsible for the upper portion has to request the designer of the lower portion to change the design. In response to the request, the designer of the lower portion modifies the design of the lower portion while checking features of the upper portion.

In such a case, if a PDM (product data management) system is employed, the designer of the lower portion can easily obtains and makes reference to the latest feature data of the upper portion. However, the designer of the lower portion has difficulty in identifying modified portions and details of modifications from the obtained latest feature data. For assisting the user to identify the modifications, some CAD systems or PDM systems have a feature to extract modified parts in the feature data as a difference and present it to a user.

Hereinafter, three methods to present differences in design modifications of a designed product in conventional techniques will be described with reference to FIGS. 14A and 14B.

FIG. 14A is a diagram illustrating a designed product 100 before a design modification, and FIG. 14B is a diagram illustrating the designed product 100' after the design modification. In this example, in the designed product 100' after the design modification, features are modified such that a new element 101 has been added to the designed product 100 before the design modification while a key opening 102 in the designed product 100 before the design modification has been deleted. In addition, in the designed product 100' after the design modification, the width of 6×4 key openings 103' is increased as compared to the 6×4 key openings 103 in the designed product 100 before the design modification. Furthermore, an element 104 in the designed product 100 before the design modification has been displaced to an element (power button) 104' in the designed product 100' after the design modification. The rounded portions of the edges (chamfering) have also been modified between the designed products 100 and 100' before and after the design modification.

(1) Presentation of Differences by Means of Superimposition of Features

In FIG. 15, the difference before and after the modification is presented on a display by superimposing the feature data before the modification (image of the product 100) and the feature data after the modification (product 100'). More specifically, on the display, the feature data before the modification and the feature data after the modification are drawn and displayed in the same position using different colors. For example, when the feature data before the modification is displayed in blue and the feature data after the modification is displayed in yellow, non-modified portions will be displayed in green because blue and yellow are superimposed. This can allow a designer before the display to visually distinguish between portions present only in the pre-modification design, portions present only in the post-modification design, and non-modified portions. Since the designer can see the feature data before the modification and the feature data after the modification on the same screen, the differences before and after the modification can be easily identified. However, if a modified portion is smaller or is located behind another shape, the designer may overlook the difference.

(2) Presentation of Differences by Means of List of Modified Parts

In FIG. 16, the difference before and after the modification is presented on a display by listing the details of the modified parts. When the designer selects an item on the list on the screen, the portion of the feature data corresponding to the selected item may be highlighted. However, the designer cannot intuitively identify which portions in the feature data has been modified from the list of the details of modifications displayed on the screen. Even when the corresponding portion is highlighted, the designer has to select an item to be highlighted on the list, and the designer may experience difficulty in obtaining the entire picture of the modification. In addition, since every detail of the modifications is enlisted, the list often become very lengthy, which may increase the risk of overlooking significant modifications.

(3) Presentation of Differences by Means of Highlighting

In FIG. 17, the difference before and after the modification is presented on a display by highlighting the modified portions in the feature data after the modification (image of the product 100') by displaying the difference in red or displaying it brighter, for example. In such a case, the designer can easily identify the modified portions, this presentation provides no suggestions on modification details, the pre-modification design and how the design is modified. Accordingly, the designer has to make comparison between before and after modification. In addition, if many modified portions are present, the designer tends to overlook minute changes.

Meanwhile, for presenting differences of design modification, the following technique is known in which the number of differences to be displayed can be reduced. For example, a technique has been known in which part information of two diagrams, such as connection diagrams of circuit diagrams, are mapped into the semantic space and the differences are extracted, thereby highlighting the portions to which meaningful modifications are made. In addition, another technique is known which detects a modified portion in a level that can be regarded as an electronic document update by means of pre-processing for extracting an important portion and a value determination unit that decides whether the extracted difference is a significant difference.

As described above, a CAD system or a PDM system can display a difference of feature data, and the presentation of that difference is utilized by multiple designers in a collaborative design task. However, in a conventional system, it is difficult for a certain designer to identify difference information that the designer requires from multitude of differences. This may cause a problem in which the designer may overlook a different that required to be checked, which may cause a problem.

The reason why such a problem arises is that multitude of differences a presented indiscriminately. Although there may be multitude of modifications by other designers, not all of the modifications are required to be checked by a certain designer. Accordingly, a need exists to present only information about modified portions that are required to be reviewed among a large number of modifications, depending on the designer.

The problem in that a lot of differences are detected is similar to those discussed in Japanese Patent No. 3761156 and Japanese Laid-Open Patent Application No. 2004-86851, the techniques disclosed in Japanese Patent No. 3761156 and Japanese Laid-Open Patent Application No. 2004-86851 cannot be applied to feature data that the present application is directed to.

The reason why the techniques disclosed in Japanese Patent No. 3761156 and Japanese Laid-Open Patent Application No. 2004-86851 cannot be applied to feature data that the present application is directed to will be described.

Japanese Patent No. 3761156 is a technique for presentation of differences in an electric circuit. In this technique, connection points and connection likes of a part is classified and compared by focusing on the potentials, and the semantic difference of an electric circuit is highlighted. In contrast, since the present application is directed to a CAD system that generates three-dimensional features, there is no notion of potentials. Thus, the technique of Japanese Patent No. 3761156 cannot be applied to the present application.

Japanese Laid-Open Patent Application No. 2004-86851 is a technique for difference presentation of electronic documents, such as Web pages or text data. The technique displays only modifications of important portions in an electronic document, and the technique for identifying important portions in a frame of the HTML (Hyper Text Markup Language), and the technique that determines important portions by means of the amount of differences and natural language processing. More specifically, these techniques are based on comparison of text data, and cannot be applied to three-dimensional features to which the present application is directed.

SUMMARY

A design assistance apparatus of the present disclosure includes a referenced portion identification unit that identifies a portion to which a reference is made during a modification operation of feature data; a referenced portion accumulation unit that accumulates the referenced portion identified by the referenced portion identification unit; a modified portion identification unit that identifies a portion modified from new and old feature date; a referencing determination unit that determines whether a reference to the modified portion identified by the modified portion identification unit is made based on information accumulated in the referenced portion accumulation unit; and a difference display unit that displays, on a display, information related to the modified portion that is determined as having been referenced to by the referencing determination unit.

In addition, a computer-readable recording medium of the present disclosure having a design assistance program stored thereon, the program making a computer function as: a referenced portion identification unit that identifies a portion to which a reference is made during a modification operation of feature data; a referenced portion accumulation unit that accumulates the referenced portion identified by the referenced portion identification unit; a modified portion identification unit that identifies a portion modified from new and old feature date; a referencing determination unit that determines whether a reference to the modified portion identified by the modified portion identification unit is made based on information accumulated in the referenced portion accumulation unit; and a difference display unit that displays, on a display, information related to the modified portion that is determined as having been referenced to by the referencing determination unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 2 is a block diagram illustrating a hardware configuration of the design assistance apparatus of the present embodiment, together with the functional structure;

FIG. 3A is a perspective view illustrating a designed product before a design modification in which a feature is added to the designed product;

FIG. 3B is a perspective view illustrating the designed product after the design modification;

FIG. 4A is a perspective view illustrating a designed product before a design modification in which a closed feature element is modified in a position;

FIG. 4B is a perspective view illustrating the designed product after the design modification;

FIG. 7 is a diagram illustrating an example of a referenced portion database in the design assistance apparatus of the present embodiment;

DESCRIPTION OF THE PREFERRED EMBODIMENTS

Hereunder is a description of embodiments with reference to the drawings.

(1) Configuration of Design Assistance Apparatus of the Present Embodiment

Figure 1:
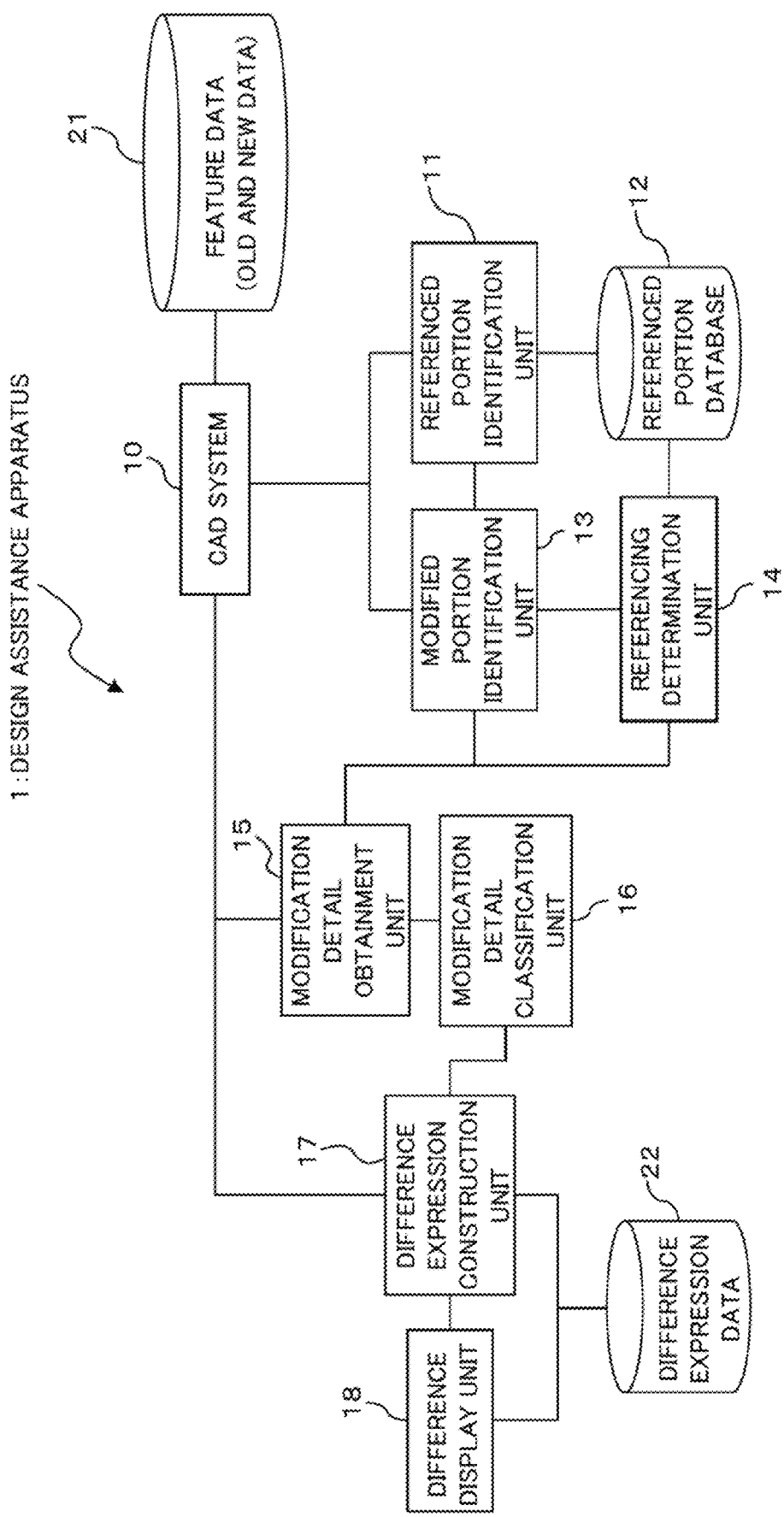
FIG. 1 is a block diagram illustrating a functional structure of design assistance apparatus of the present embodiment.

FIG. 1 is a block diagram illustrating a functional structure of design assistance apparatus 1 of the present embodiment, and FIG. 2 is a block diagram illustrating a hardware configuration of the design assistance apparatus 1 of the present embodiment, together with the functional structure.

As depicted in FIG. 2, the design assistance apparatus 1 of the present embodiment at least includes a processing apparatus 1a, a storage apparatus 1b, a primary storage apparatus 1c, an input apparatus 1d, and a display 1e, as hardware.

The processing apparatus 1a may include a CPU (central processing unit) or the like, the storage apparatus 1b may include an HDD (hard disk drive) and the like, and the primary storage apparatus 1c may include a ROM (read only memory), an RAM (random access memory), or the like. The input apparatus 1d may include a mouse, a keyboard, and the like, operated by a user (hereinafter, sometimes referred to as a "designer"), and the display 1e may include a CRT (cathode ray tube), an LCD (liquid crystal display), or the like.

In the design assistance apparatus 1 which will be described later, a CAD system 10 is provided in the processing apparatus 1a, as depicted in FIG. 2. In addition, feature data of a designed product designed using the CAD system 10 (CAD data; including the new and old feature data) is stored in the storage apparatus 1b. The designer designs the portion of designed product assigned to the designer by operating the CAD system 10 through the input apparatus 1d, such as a keyboard or a mouse, while making reference to the processing result displayed on the display 1e.

Note that the CAD system 10 is embodied by the processing apparatus 1a executing a certain program. The program is loaded and executed from any one of the storage apparatus 1b, the primary storage apparatus 1c, various external storage apparatuses, and various storage media. The functions of the design assistance apparatus 1 of the present embodiment may be embodied as functions of another system that is closely associated with the CAD system 10, or one function of the CAD system 10.

In the design assistance apparatus 1 of the present embodiment, when the processing apparatus 1a executes a design assistance program, the processing apparatus 1a functions as component elements (see reference symbols 11 and 13 to 18), which will be described later, and the storage apparatus 1b function as a referenced portion database 12. In addition, difference expression data 22 is constructed by a difference expression construction unit 17, which will be described later, and is displayed on display 1e after the construction. The difference expression data 22 is stored and placed in the primary storage apparatus 1c. Although the referenced portion database 12 is located in the storage apparatus 1b, it may be located in a remote location via a network or the like.

Hereinafter, a referenced portion identification unit 11, a referenced portion database 12, a modified portion identification unit 13, a referencing determination unit 14, a modification detail obtainment unit 15, a modification detail classification unit 16, a difference expression construction unit 17, and a difference display unit 18 in the design assistance apparatus 1 will be described.

The referenced portion identification unit 11 identifies a portion referenced during a modification operation of feature data by a designer, and the referenced portion database (referenced portion accumulation unit) 12 accumulates the referenced portion identified by the referenced portion identification unit 11. The referenced portion identification unit 11 obtains the identification information of the referenced portion. As will be described below in detail with reference to FIG. 7, the referenced portion database 12 stores the identification information of the referenced portion identified by the referenced portion identification unit 11 while relating it to the identification information (identifier) of designer who makes reference to the referenced portion. As described above, in the design assistance apparatus 1 of the present embodiment, the referenced portion identification unit 11 constantly monitors processing instructions or the like to the CAD system 10, and obtains the referenced portion from the input apparatus 1d during design by the designer.

The referenced portion identification unit 11 will be described in more detail.

Modification of the feature data is made using the CAD system 10 during designing by the designer. The referenced portion identification unit 11 obtains information (identifier) identifying a portion, which is part of feature data and which has been referenced to by a designer when the designer has modified the feature data using CAD system 10.

Here, the "significant reference" to the portion means a reference which is required to be checked by the designer when the referenced portion is modified. Examples of such references include references of the following (a) to (d), for example.

(a) When defining a feature using the CAD system 10, a reference to a portion which is selected as a norm of that feature.

(b) A reference to a dimension value used as an element for defining a feature.

(c) A selection reference to a portion which is made for measuring a distance or angle upon review, resign and inspection.

(d) A reference to a portion which is made to determine the position and posture of a feature upon generating data of a larger feature by combining multiple features.

When defining a define using the CAD system 10, data of another feature is often referenced to as a norm (the above (a)). In addition, rather than specifying a concrete value as a dimension value of a feature to be defined, a definition is often made to refer to the dimension value of data of another feature (the above (b)). In such a case, some of modern CAD systems automatically modify a referencing feature when a referenced feature data is modified. However, even when the modification is automatically made, verification should be made to check whether the modification is valid or not.

When concrete values are specified without defining a reference to a dimension value of other feature data, the distance or angle between portions is often measured using other feature data as a reference for review, design, and inspection (the above (c)). When a designer executes measurement processing on the CAD system 10, the designer has some intentions. When the value obtained in the measurement processing is modified by another designer, a check by the designer who executed the measurement is required.

A designed object is typically defined by combining a plurality of pieces of feature data. Upon defining, in order to determine the position and posture of the feature data, portions of other feature data are often referenced to (the above (d)). Since the position and posture of the referencing feature data are affected when a referenced portion is modified, a check by the designer is required.

The referenced portion identification unit 11 constantly monitors processing instructions and the like made to the CAD system 10 by a designer, and, when a significant reference is made to a portion of feature data by the designer, the referenced portion identification unit 11 obtains information identifying that portion.

The information identifying that portion identified by the referenced portion identification unit 11 is registered into the referenced portion database 12, while being associated with information (ID) identifying the designer. As described above, the portion identified by the referenced portion identification unit 11 is the portion that is considered as requiring a check by the designer when the portion is modified. The information identifying that portion is registered while being associated with the ID of the designer. Thus, when the portion is a modified portion, a determination as to whether the modification requires a check by the designer can be made by making a search on the referenced portion database 12.

The display of a difference, that is, a display of the portion which underwent a design modification is executed by the processing apparatus 1a in response to an implicit instruction by the designer, or automatically executed at some timing by the CAD system 10 (or PDM system). Whether display of a difference is executed in response to an instruction by the designer or automatically executed is not limit in the present disclosure.

When the difference is displayed, the old and new feature data are required for making comparison. As depicted in FIGS. 1 and 2, such feature data is saved in the storage apparatus 1b as CAD data 21, and the old and new data is accessed by way of the CAD system 10. Here, the old data is the feature data when the designer made a significant reference as described above, and the new data is the latest feature data to which some design modification was made after the significant reference by the designer.

The modified portion identification unit 13 is adapted to identify a portion (modified portion) to which a design modification was made after the significant reference by the designer, from the old and new feature data stored in the storage apparatus 1b upon a difference presentation. More specifically, the modified portion identification unit 13 identifies the modified portion by comparing the new and old feature data, and obtains information identifying that modified portion (identification information/identifier). The obtained information identifying that portion corresponds to the identification information that is identified by the referenced portion identification unit 11 and registered into the referenced portion database 12 (see FIG. 7, for example).

The referencing determination unit 14 is adapted to determine whether a reference has been made to the modified portion identified by the modified portion identification unit 13, based on information accumulated in the referenced portion database 12. More specifically, the referencing determination unit 14 determines whether the modified portion was referenced to during design before the modification, from modified portion identified by the modified portion identification unit 13 and the referenced portion database 12.

More specifically, the referencing determination unit 14 makes a search on the referenced portion database 12, based on the information identifying that modified portion identified by the modified portion identification unit 13 and the ID of the designer who refers to a current difference presentation. As described above, the information identifying a portion to which a significant reference was made by the designer is registered into the referenced portion database 12 while being associated with the ID of the designer who made that reference. Accordingly, by making such a search, a determination as to whether the modified portion is a referenced portion that was referenced to by the designer, in other words, whether a modification was made to the referenced portion that was referenced to by the designer, can be made.

When a design modification has been made to the referenced portion registered in the referenced portion database 12, the modification of must be notified to the designer who made the reference to that portion for check by the designer. The referencing determination unit 14 determines whether a significant reference has been made to the portion by checking whether the information identifying that portion identified by the modified portion identification unit 13 is registered into the referenced portion database 12. This is because when a significant reference has been made to that portion, the difference of that portion must be displayed.

The modification detail obtainment unit 15 is adapted to obtain a modification detail of the modified portion that is determined as having been referenced to by the referencing determination unit 14, from the new and old feature data in the storage apparatus 1b. The modification detail obtained by the modification detail obtainment unit 15 includes addition or deletion of a feature, modification of a dimension value, modification of referenced portion, such as a norm, for example. Some of modern CAD systems support obtainment such modification details. If such modification detail is not available in a CAD system, it is possible to obtain the modification detail by extracting all element data constituting feature data from old and new feature data, and comparing corresponding extracted element data between the new and old feature data.

The modification detail classification unit 16 is adapted to analyze the modification detail obtained by the modification detail obtainment unit 15, and classify it into a plurality of modification types. More specifically, the modification detail classification unit 16 analyzes the modification detail obtained by the modification detail obtainment unit 15, and classifies the modification detail into a plurality of modification types, depending on what kind of modification was made to the modified portion. Examples of the modification types include four types: "feature addition", "deletion", "feature modification", and "displacement", for example, and the modification detail classification unit 16 classifies the modification detail into one of the four modification types in the present embodiment.

Figures 5A, 5B:
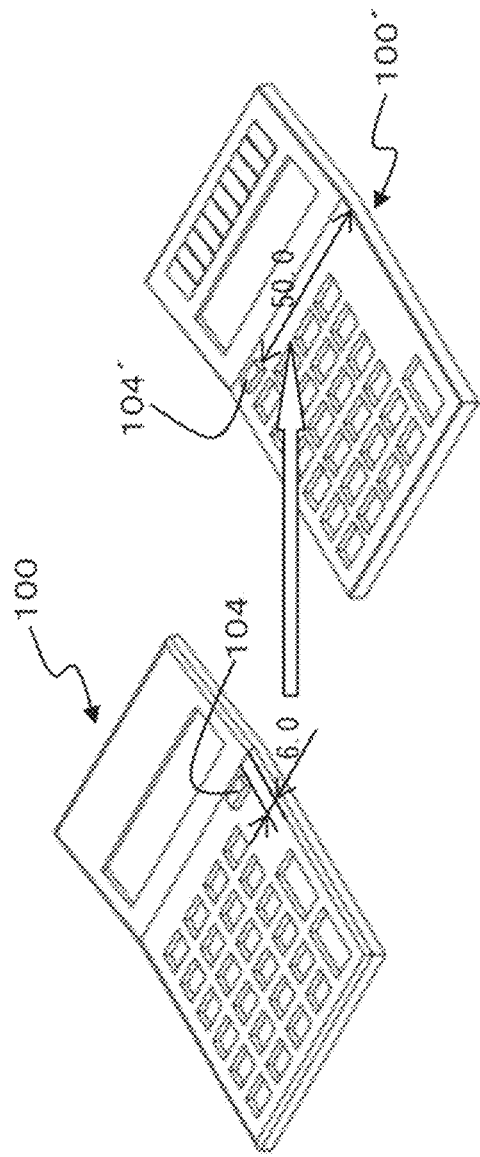
FIG. 5A is a perspective view illustrating a designed product before a design modification in which a feature element related to another location is modified.
FIG. 5B is a perspective view illustrating the designed product after the design modification.
Figure 6:
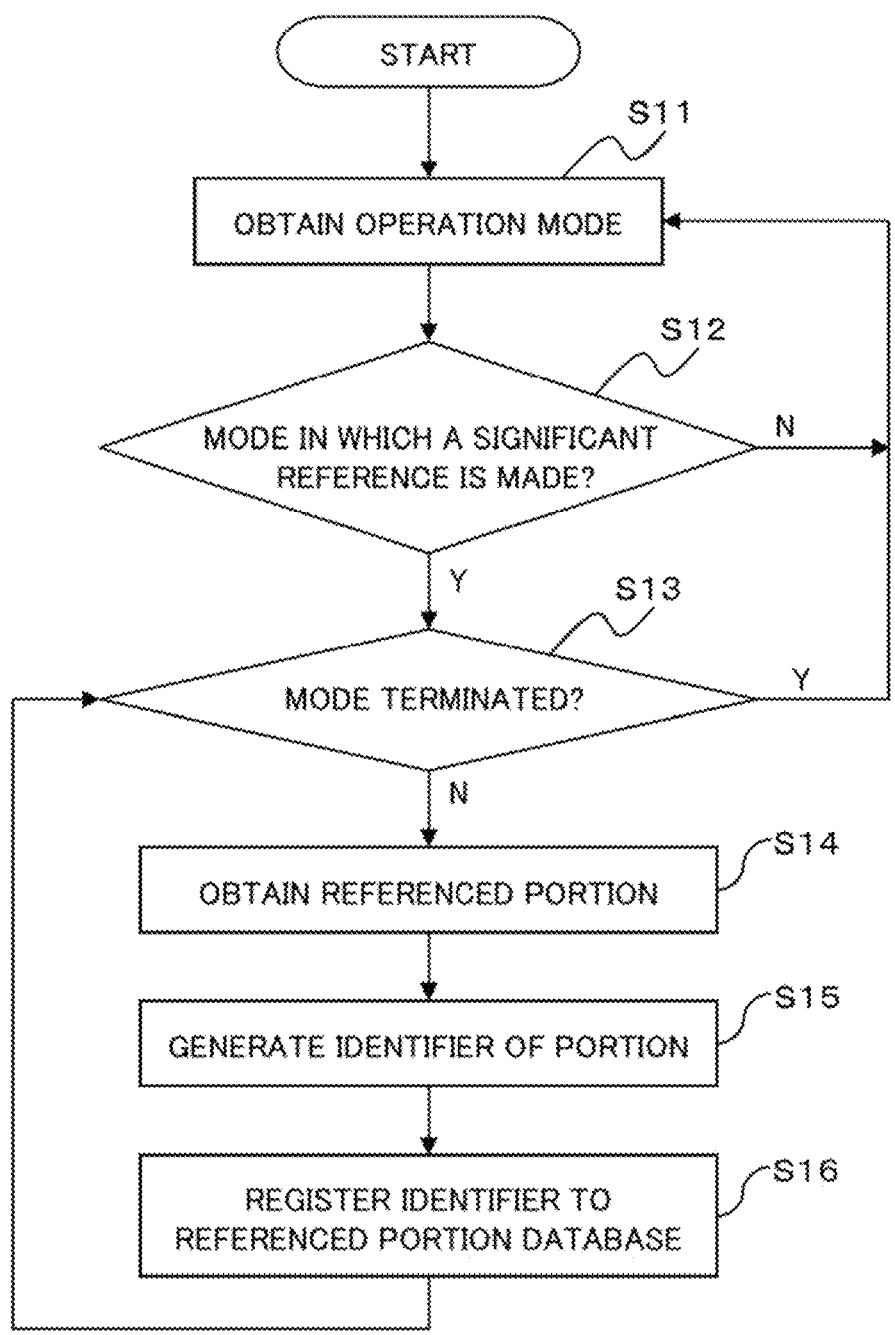
FIG. 6 is a flowchart illustrating referenced portion obtainment processing in the design assistance apparatus of the present embodiment.
Figure 14B:
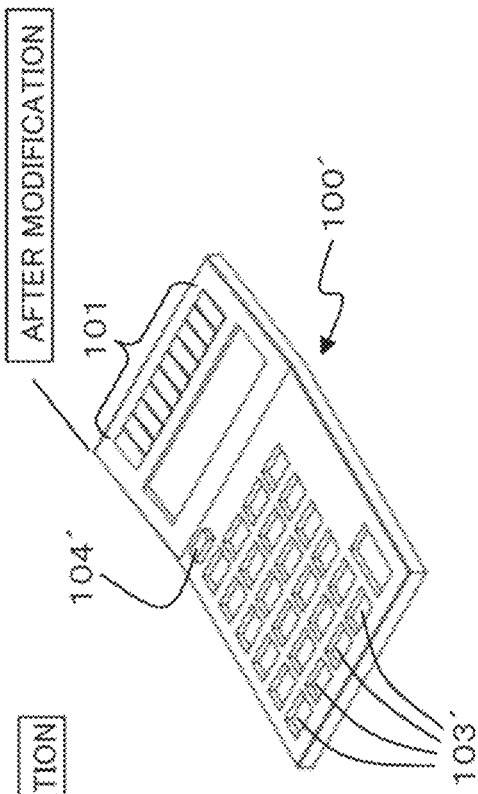
FIG. 14B is a perspective view illustrating the designed product after the design modification.
Figure 14A:
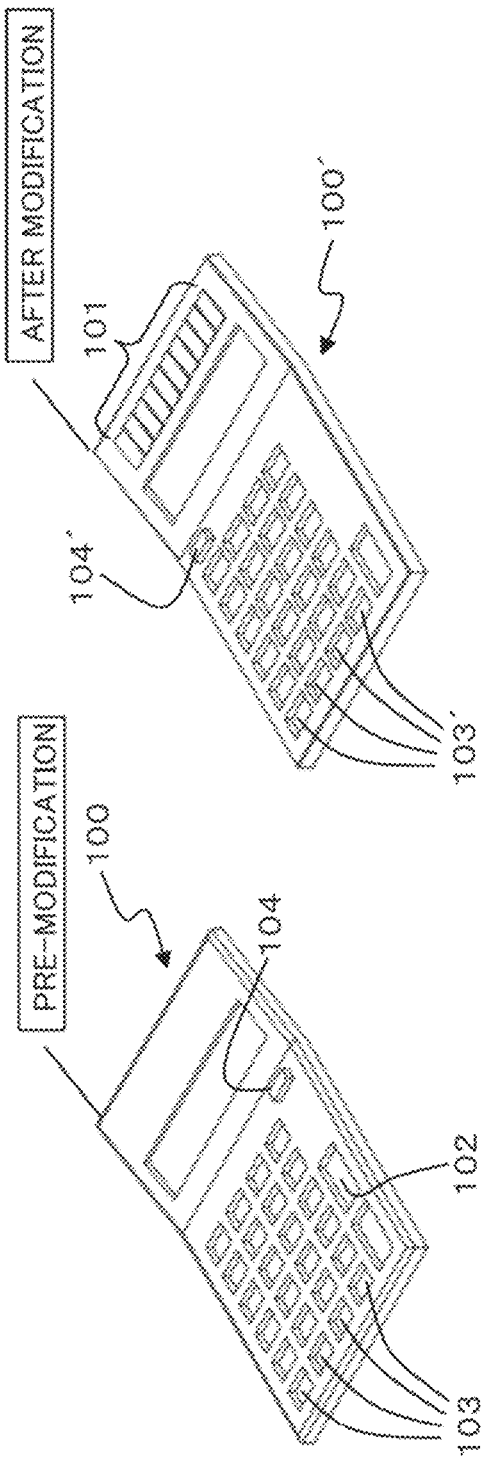
FIG. 14A is a perspective view illustrating a designed product before a design modification.
Figure 15:
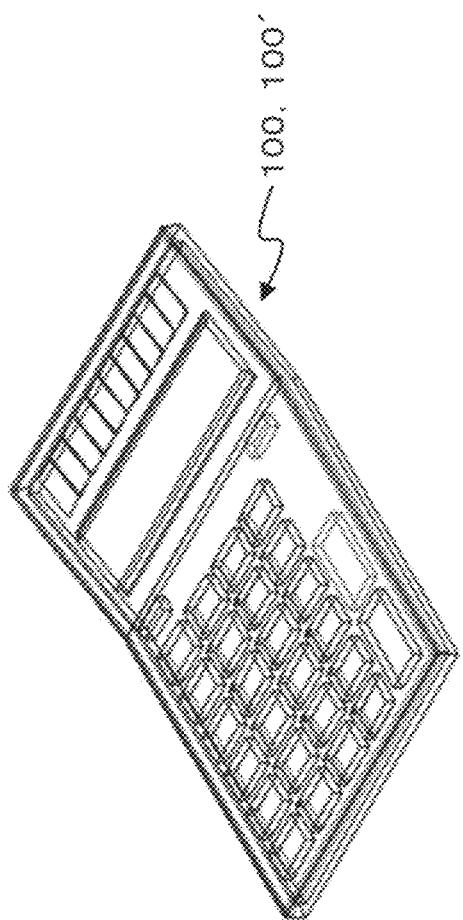
FIG. 15 is a diagram illustrating an example of a difference presentation by means of superimposition of features.
Figure 16:
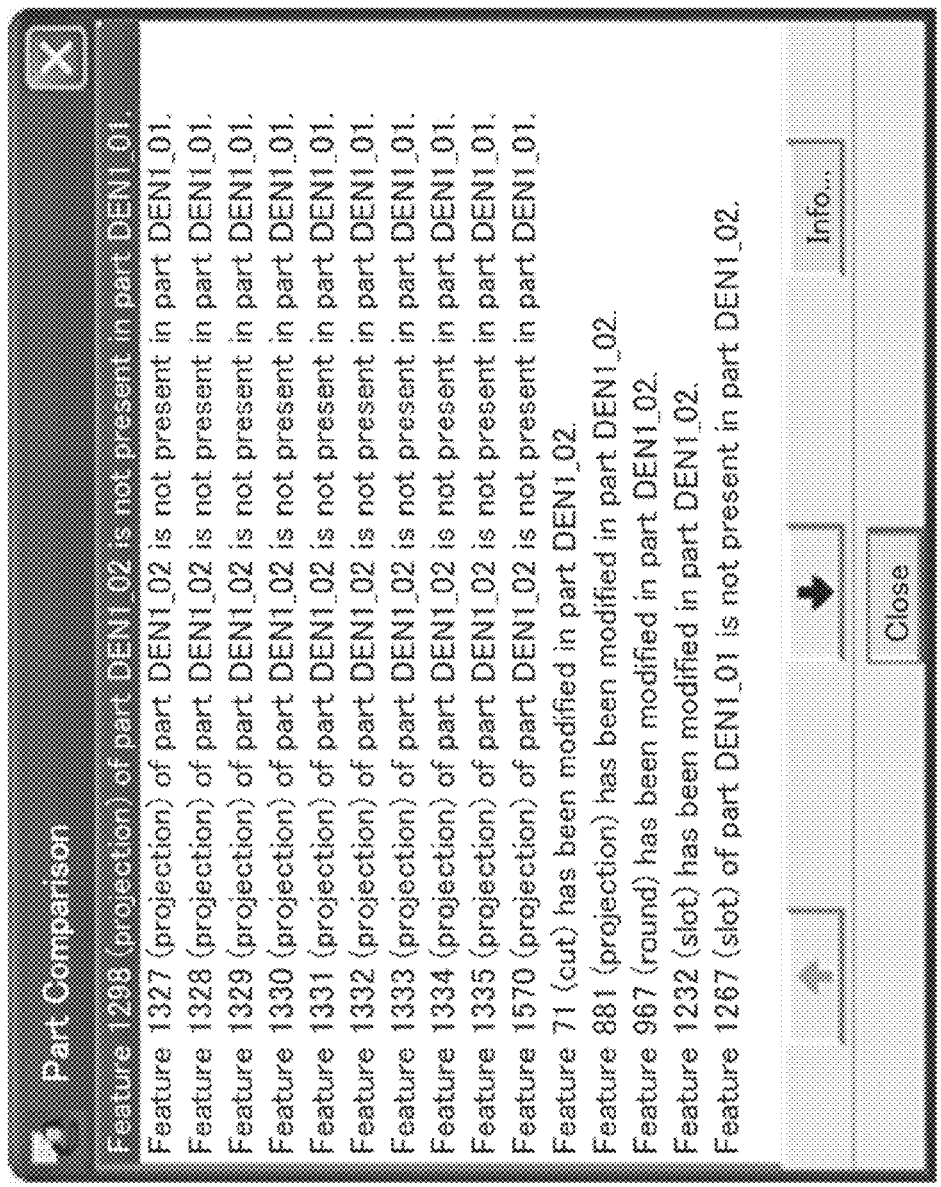
FIG. 16 is a diagram illustrating an example of a difference presentation by means of a list of details of modifications.
Figure 17:
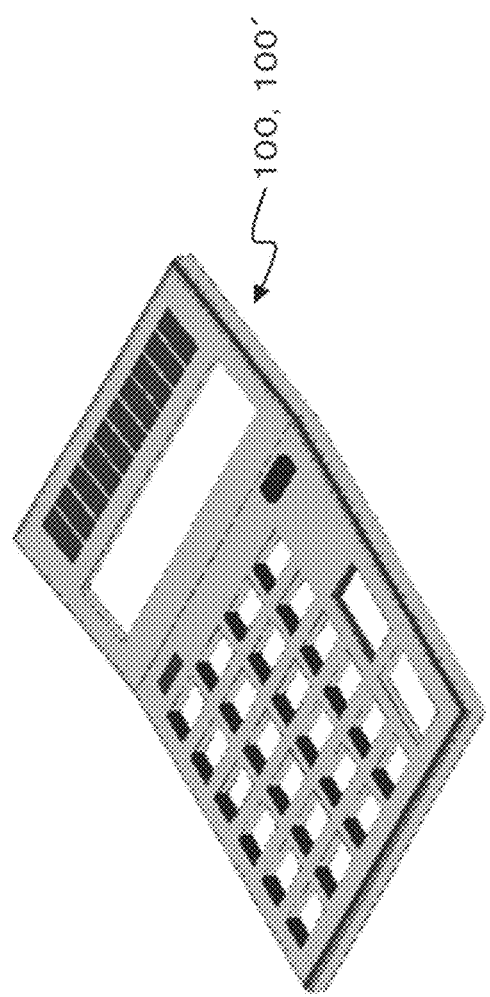
FIG. 17 is a diagram illustrating an example of a difference presentation by means of highlighting modified portions.

Here, the four modification types listed above will be described with reference to FIG. 3A to FIG. 5B. Since reference symbols that have been described in FIG. 14A and FIG. 14B reference the same or similar elements in FIG. 3A to FIG. 5B, the description thereof will be omitted. In addition, FIG. 3A, FIG. 4A and FIG. 5A depict a designed product 100 corresponding to old feature data before a design modification while FIG. 3B, FIG. 4B and FIG. 5B depict a designed product 100' corresponding to the old feature data after the design modification.

In the modification detail, when a feature that is not present in the old feature data is present in the new feature data, that modification detail is classified into "feature addition". In contrast, when a feature that is present in the old feature data is not present in the new feature data, that modification detail is classified into "deletion." Note that "feature addition" and "deletion" in this context may not correspond to processing in the CAD system 10. For example, FIG. 3A and FIG. 3B depict an example of feature addition to a designed product. The modification depicted in FIG. 3A and FIG. 3B corresponds to processing of "deletion" of a key opening 102 in a typical CAD system 10. However, when considering the upper cover as an object, it is more intuitive to regard this modification as addition of an object filling the key opening 102, rather than deletion of "absence of material", i.e., the key opening 102. For this reason, in this case, the modification type of the modification detail is classified into "feature addition". As described above, it is more preferable that the modification detail classification unit 16 classifies modification types in a manner that is more intuitive to the designer.

In the modification detail, when a corresponding feature is present in both the old feature data and the new feature data but the values of the element defining that feature are different and the affected range by the modification of the value of the element is limited to a portion, this modification detail is classified to "feature modification". For example, FIG. 4A and FIG. 4B depict an example of a modification of a feature element that is limited to a portion in a designed product. In FIG. 4A and FIG. 4B, the dimension (width) of a key opening 103 in an upper cover of a calculator is modified from 9.0 mm to 10.0 mm. Although the dimension values of the key openings 103 and 103' are different, the modification is limited to a portion, i.e., the key opening, and does not affect to other portions. In such a case, modification detail is classified to "feature modification".

In the modification detail, when a corresponding feature is present in both the old feature data and the new feature data but the values of the element defining that feature are different and the modification of the value of the element affects other portion(s), this modification detail is classified to "displacement". For example, FIGS. 5A and 5B depict an example of a modification of a feature element that affects other portion(s) in a designed product. In FIGS. 5A and 5B, the distance of a power button 104 in an upper cover of a calculator from the right end of the upper cover is modified from 6.0 mm to 50.0 mm. In addition to the power button 104, this modification also affects the right end of the upper cover. In such a case, the modification detail is classified to "displacement".

The difference expression construction unit 17 is adapted to establish a difference expression of the modified portion, based on the classification result by the modification detail classification unit 16 and the new and old feature data. More specifically, the difference expression construction unit 17 generates and establishes difference expression data (data achieving a difference expression) about the modified portion in accordance with the modification type classified by he modification detail classification unit 16, from the new and old feature data. The difference expression data generated and established by the difference expression construction unit 17 is stored into the primary storage apparatus 1c (see reference symbol 22 in FIGS. 1 and 2).

Here, examples of difference expression data generated and established in accordance with the modification type include animation data and image data as follows.

Figure 11:
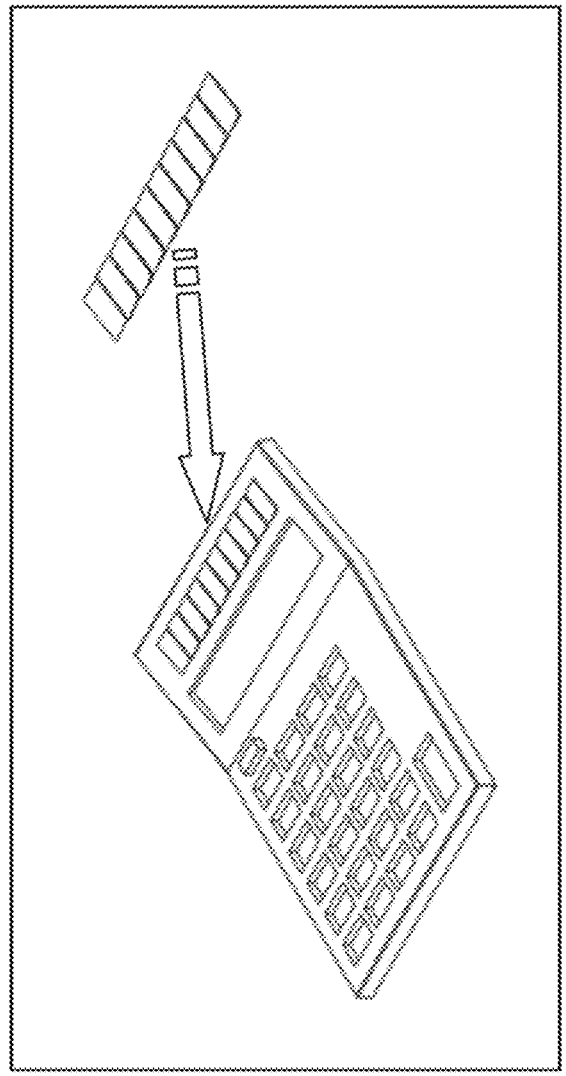
FIG. 11 is a diagram illustrating an example of a difference expression upon a feature addition.

When the modification type is "feature addition", animation data showing the added feature moving from the outside of the feature data toward the added position may be generated as difference expression data, for example (see FIG. 11).

Figure 12:
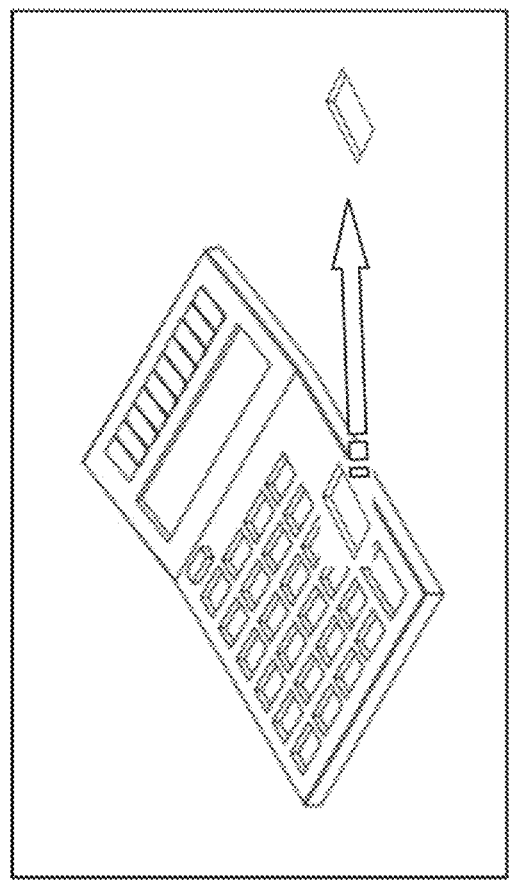
FIG. 12 is a diagram illustrating an example of a difference expression upon a feature deletion.

When the modification type is "deletion", animation data showing the deleted feature moving toward the outside of the feature data and then disappearing may be generated as difference expression data, for example (see FIG. 12).

When the modification type is "feature modification", image data in which the pictures before and after the modification are superimposed while the feature modified portion is being highlighted may be generated as difference expression data, for example.

When the modification type is "displacement" and when the displaced distance exceeds a certain threshold, animation data showing a picture being displaced from position before the move to the position after the move is generated as difference expression data (see FIG. 13), for example. In contrast, when the displaced distance does not exceed the threshold, animation data showing a picture being displaced beyond the threshold and then moved to a correct displacement position is generated as difference expression data.

Upon generating the difference expression data, if the CAD system 10 has a corresponding functions, the functions as the difference expression construction unit 17 is embodied by utilizing the feature of the CAD system 10. Even if the CAD system 10 does not have such a function, picture information can be obtained from the CAD system 10. Accordingly, the functions as the difference expression construction unit 17 is embodied by applying a general CG (computer graphics) technique. Note that the above examples of difference expression data are merely exemplary, and difference expression data and generation methods are not limited by the examples in the present disclosure.

The difference display unit 18 is adapted to display information about the modified portion that is determined as having been referenced to by the referencing determination unit 14 on the display 1e. More specifically, the difference display unit 18 displays difference expression data defined by the difference expression construction unit 17, to each designed identified by an ID, that is, to certain designers, as information about the modified portion on the display 1e. The difference display unit 18 may displays the difference expression data on a display of the CAD system or on another display.

(2) Operation of Design Assistance Apparatus of the Present Embodiment

Next, the design assistance apparatus 1 of the present embodiment, which is constructed as described above, will be described with reference to FIGS. 6-13.

During design task by the designer, i.e., during the modification operation of feature data 21, instruction, such as processing instructions, from the input apparatus 1d to the CAD system 10 are constantly monitored by the referenced portion identification unit 11, and information about a portion to which a significant reference was made by the designer.

The referenced portion identification unit 11 constantly monitors the status of the CAD system 10 (operation mode) and an input from the designer while the CAD system 10 is used by the designer, and when the designer makes a significant reference to a portion in the CAD system 10, the he referenced portion identification unit 11 extracts the referenced portion. The details of processing by the referenced portion identification unit 11 are different depending on a CAD system since every CAD system has different operational procedures. However, referenced portion obtainment processing of a typical CAD system 10 will be described here. Hereinafter, the referenced portion obtainment processing will be described with reference to the flowchart depicted in FIG. 6 (Step S11 to S16).

In a typical CAD system 10, before performing the processing, the designer specifies particular processing on the CAD system 10, and makes the CAD system 10 transitions to the operation mode for the processing. For example, the CAD system 10 is transitioned to the feature definition mode for defining a feature, while the CAD system 10 is transitioned to the dimension measurement mode for measuring the dimension. Firstly, in Step S11, such an operation mode is obtained.

In Step S12, it is determined whether the operation mode obtained in Step S11 is a mode in which a significant reference may be made by a designer. For example, examples of operation modes in which a significant reference may be made include the feature definition mode or the dimension measurement mode, while examples of operation modes in which a significant reference may not be made include the modification mode of the display 1e. The referenced portion identification unit 11 contains information about the operation modes in which a significant reference may be made, and the determination in Step S12 is made by determining that the operation mode obtained in Step S11 matches the information stored in he referenced portion identification unit 11.

When it is determined that the operation mode is a mode in which a significant reference may be made by the designer in Step S12 (the Y route in Step S12), it is determined whether the operation mode has terminated in Step S13. When the operation mode has terminated (the Y route in Step S13), the flow returns to Step S11 wherein a new operation mode is obtained.

Otherwise, when it is determined that the operation mode has not terminated (the N route in Step S13), the flow proceeds to Step S14 in which a referenced portion is identified by the referenced portion identification unit 11. A typical example of a reference operation by the designer is pickup of a feature using a mouse (the input apparatus 1d). In Step S14 (the referenced portion identification unit 11), a referenced portion is obtained when such a pickup operation is made by the designer.

In Step S15, identification information for the portion obtained in Step S14 is generated. When a unique ID has been assigned to the referenced portion, that ID can be used. In some CAD systems 10, the referenced portion can be identified by a combination of multiple IDs, such as a file name or other IDs. In Step S15, necessary information is corrected, and information for identifying the referenced portion is generated.

In Step S16, the identification information generated in Step S15 is accumulated into the referenced portion database 12. The generated identification information is registered and accumulated into the referenced portion database 12 while being related to the identification information (identifier/ID) the designer who makes reference to the referenced portion, as will be described later with reference to FIG. 7. After Step S16, the processing returns to Step S13 in which it is determined whether the operation mode has terminated.

Note that processing of the above Steps S11 to S16 are embodied by the processing apparatus 1a using the function of the referenced portion identification unit 11, for example, and are embodied by the processing apparatus 1a executing a design assistance program and the like.

Here, a concrete example of the referenced portion database 12 in the design assistance apparatus 1 of the present embodiment is depicted in FIG. 7. The referenced portion database 12 depicted in FIG. 7 records information identifying portions that have been referenced to by a designer. In a certain three-dimensional CAD, an ID that is unique in a file is given for each picture element type. In such a case, a portion can be uniquely identified by three pieces of information, namely, a file name, a picture element type, and an element ID. Accordingly, such information made of three types of element is registered in the referenced portion database 12 while being associated with information (user ID) identifying the user, i.e., designer, as depicted in FIG. 7. Here, picture element types include "faces", "edges", "points", "projections", and "openings".

As described above, information about a portion to which a significant reference was made by the designer is obtained during design by the designer, and the information is accumulated in the storage apparatus 1b while being associated with the ID of the designer, thereby generating the referenced portion database 12 as depicted in FIG. 7. Relying on such a referenced portion database 12, difference display processing is commenced in the design assistance apparatus 1 (the processing apparatus 1a) generally in response to an instruction from a designer. Note that the difference display processing may be automatically executed at some timing by the CAD system 10, as described above.

Figure 8:
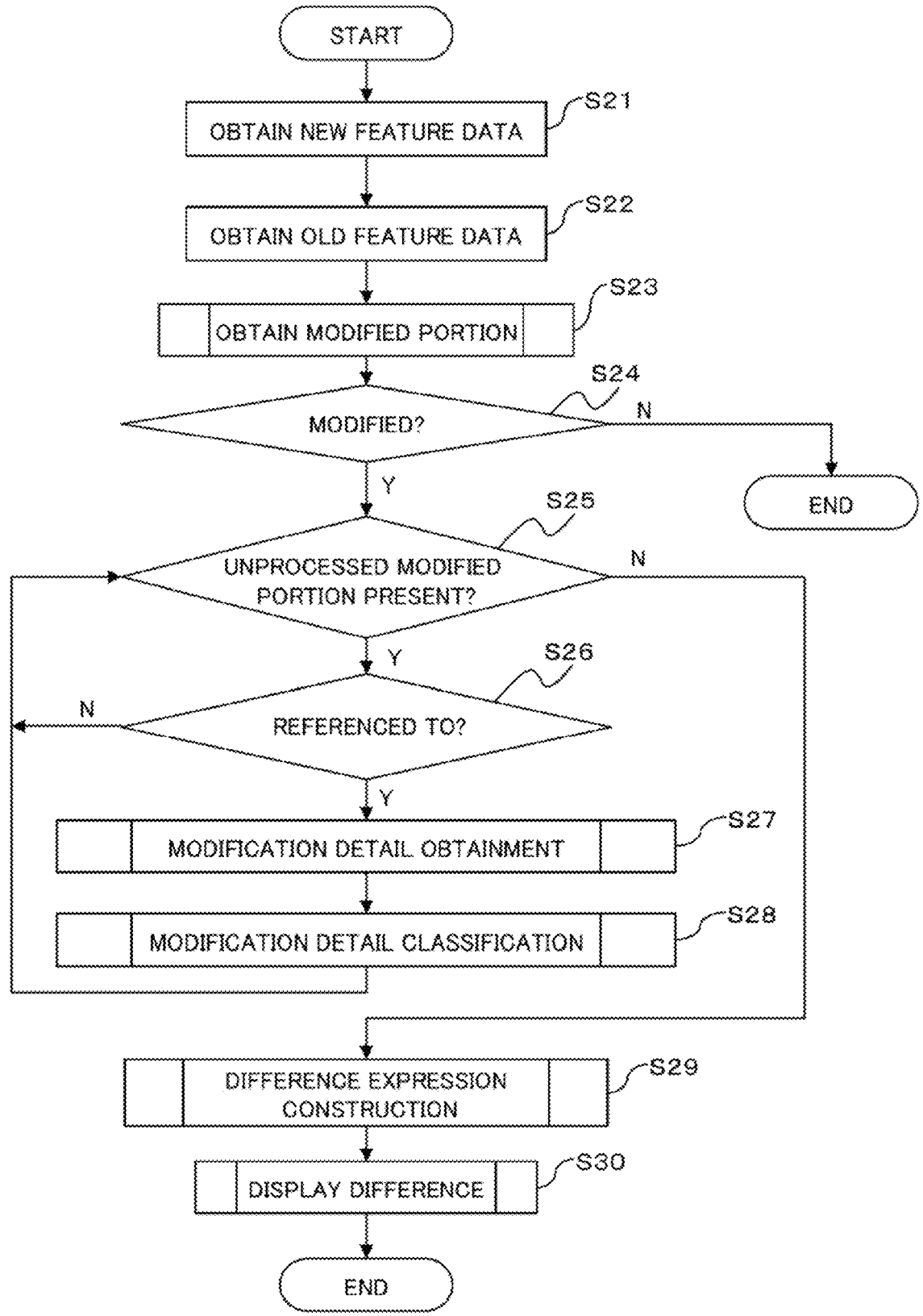
FIG. 8 is a flowchart illustrating difference display processing in the design assistance apparatus of the present embodiment.

Next, difference display processing in the design assistance apparatus 1 of the present embodiment will be described with reference to the flowchart depicted in FIG. 8 (Steps S21 to S30).

In Step S21, new feature data is obtain from the storage apparatus 1b, and old feature data is also obtained from the storage apparatus 1b in Step S22. Typically, new feature data used for difference presentation is the latest data owned by the CAD system 10 or PDM system, while the old feature data is data owned by a designer (data at the time when a significant reference was made). The processing in Steps S21 and S22 may include, but not limited to, processing for specifying a version for making comparison for difference presentation and processing for obtaining feature data in a certain version from a database, such as the PDM system.

In Step S23, the modified portion identification unit 13 compares the new and old feature data obtained in Steps S21 and S22, respectively, and obtains a modified portion. As method for obtaining the modified portion, two methods are possible. One is to extract picture elements from both the new feature data and the old feature data and then compare the information defining the picture elements. The other is to use a geometrical computation. Either one of the method can be used as long as a modified portion can be identified. However, as discussed later in the context of the processing in Step S27, a modified portion can be more easily obtained using a geometrical computation since that portion may be modified affected by any modification to other picture elements. Both the method comparing information defining the picture elements and the method using a geometrical computation can be embodied by utilizing a function of the CAD system 10.

After completion of the processing in Step S23, a determination as to whether a modified portion is obtained in Step S23, i.e., whether a modified portion is present or not is made in Step S24. When no modified portion is obtained (when no modified portion is present; the N route in Step S24), the processing apparatus 1a terminates the difference display processing. Otherwise, when one or more modified portions are obtained (when a modified portion is present; the Y route in Step S24), the processing apparatus 1a proceeds to the processing in Step S25. Thereafter, the processing apparatus 1a executes the processing of Step S26 and subsequent steps for each modified portion, and proceeds to the processing in Step S29 once the processing is completed for all modified portions.

In Step S26, the referencing determination unit 14 checks whether a significant reference by the designer who was referencing the difference during the design task, for the modified portion obtained in Step S23. When a significant reference was made, identification information to that modified portion has been registered into the referenced portion database 12 while being associated with the ID of the designer who was referencing the difference, by means of the processing depicted in FIG. 7. Accordingly, the referencing determination unit 14 can know whether a significant reference was made during the design task by checking whether identification information of the modified portion obtained in Step S23 is registered into the referenced portion database 12 while being associated with the ID of the designer. When a significant reference was made (the Y route in Step S26), the processing apparatus 1a proceeds to the processing in Step S27. Otherwise, when no significant reference was made (the N route in Step S26), the processing apparatus 1a returns to the processing in Step S25 and repeats the processing in Steps S26 to S28 if there is another unprocessed modified portion (the Y route in Step S25).

In the determination processing in Step S26, only portions of all modified portions to which significant references were made by the designer undergo subsequent processing (Steps S27 and S28) relating to difference presentation, and modified portions to which no significant references was made are omitted from the processing. This processing is advantageous in that only portions to be checked by the designer are selected from multitude of modified portions, which facilitates check of modification details, as will be described later.

In Step S27, the modification detail obtainment unit 15 obtains a detailed modification detail from the new feature data obtained in Step S21 and the old feature data obtained in Step S22, for the portions which were determined as having been referenced to in Step S26. One portion is modified when information defining a picture element constructing a portion is modified, or when definition information is modified affected by any modification of a picture element to which a picture element constructing the portion is referencing. In this embodiment, all of modification details relating to any modification to the portion are obtained, including any modification of other portions affecting the portion concerned.

Figure 9:
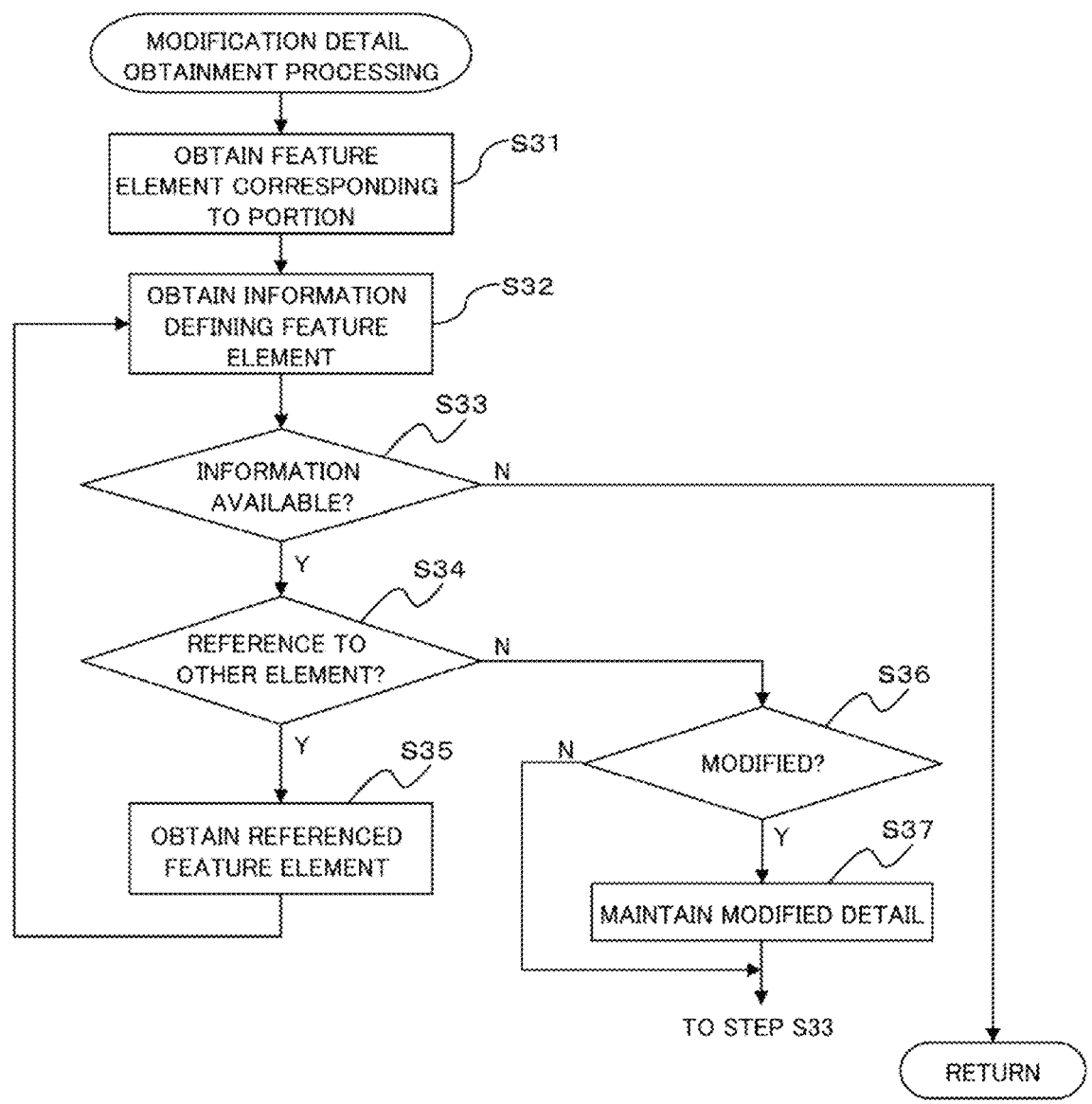
FIG. 9 is a flowchart illustrating modification detail obtainment processing in the design assistance apparatus of the present embodiment.

The processing in Step S27 in FIG. 8, i.e., the modification detail obtainment processing in the design assistance apparatus 1 of the present embodiment, will be described with reference to the flowchart depicted in FIG. 9 (Steps S31 to S37). The processing depicted in FIG. 9 is executed by the modification detail obtainment unit 15 in the processing apparatus 1a.

In Step S31, feature element (CAD data) corresponding to a portion for obtaining a modification detail is obtained. Then in Step S32, all pieces of information defining the feature element obtained in Step S31 is obtained. Examples of the information include dimension, such as the width, the depth, or the height, information about the placement position, information whether that feature element references to another element, and identification information for identifying another element (referenced element) when another element is referenced to. In Step S33, it is checked whether there is any unprocessed information obtained in Step S32. If there is no more unprocessed information (the N route in Step S33), the modification detail obtainment unit 15 terminates. Otherwise, the modification detail obtainment unit 15 repeats the processing in the following Steps S34 to S37 as long as there is any unprocessed information (the Y route in Step S33).

In Step S34, the modification detail obtainment unit 15 checks whether information defining the feature element currently processed is information making a reference to another picture element. When the information makes a reference to another picture element, i.e., when there is a referenced picture element (the Y route in Step S34), the modification detail obtainment unit 15 proceeds to the processing in Step S35, in which a referenced picture element is obtained. Then, the modification detail obtainment unit 15 returns to the processing in Step S32, obtains information defining the referenced picture element, and executes the processing similar to the information defining the referencing picture element to the information defining the referenced picture element.

When it is determined that the information is not referencing to another picture element, i.e., there is no reference picture element in Step S34 (the N route in Step S34), the modification detail obtainment unit 15 proceeds to the processing in Step S36 in which a determination made as to the information currently being processed has been modified. When the information has been modified (the Y route in Step S36), the modification detail obtainment unit 15 stores the modification detail for later use for classification of modification detail (Step S37) and returns to the processing in Step S33. Otherwise, when the information has not been modified (the N route in Step S36), the modification detail obtainment unit 15 returns to the processing in Step S33, skipping the processing in Step S37. Then, the modification detail obtainment unit 15 repeats processing in Steps S34 to S37 until processing on all pieces of information obtained in Step S32 is completed (until a non-affirmative determination is made in Step S33).

Once the modification detail obtainment processing in Step S27 is completed as described above, in Step S28, the processing apparatus 1a (the modification detail classification unit 16) analyzes the processing apparatus 1a (the modification detail classification unit 16) the modification detail obtained in Step S27, and classifies the modification detail of the portion into one of the four modification type. There are four modification types, "feature addition", "deletion", "feature modification", and "displacement" in the present embodiment.

Figure 10:
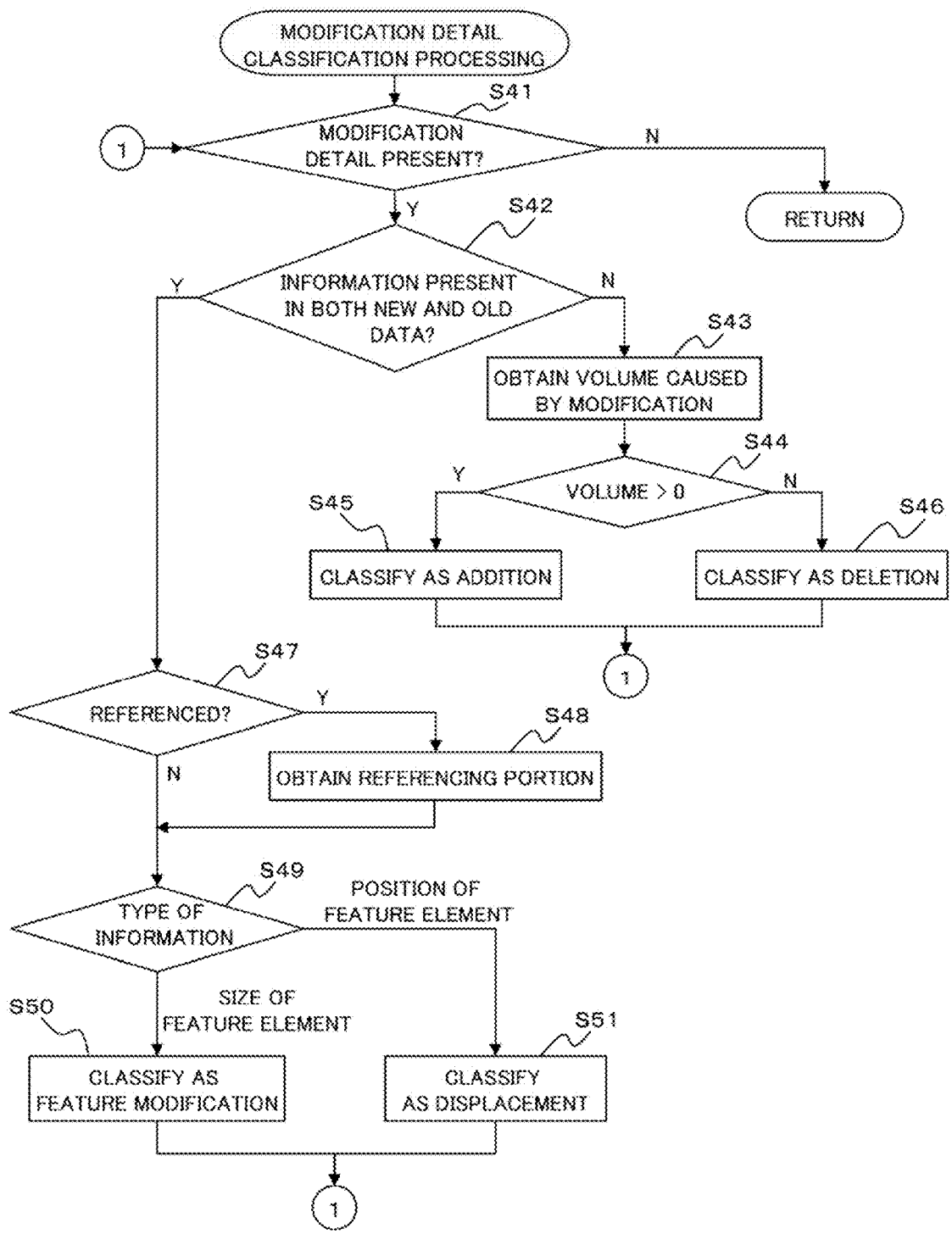
FIG. 10 is a flowchart illustrating modification detail classification processing in the design assistance apparatus of the present embodiment.

The processing in Step S28 in FIG. 8, i.e., the modification detail classification processing in the design assistance apparatus 1 of the present embodiment, will be described with reference to the flowchart depicted in FIG. 10 (Steps S41 to S51). The processing depicted in FIG. 10 is executed by the modification detail classification unit 16 in the processing apparatus 1a.

In Step S41, the modification detail classification unit 16 checks whether there is any unprocessed modification detail among one or more modification details obtained in Step S27, and executes the processing in Steps S42 to S51 as long as there is any unprocessed modification detail (the Y route in Step S41). When there is no unprocessed modification detail (the N route in Step S41), the modification detail classification unit 16 terminates the modification detail classification processing.

In Step S42, the modification detail classification unit 16 checks whether information defining the feature element corresponding to the modification detail is present both in new feature data and old feature data, and proceeds to the processing in Step S43 when the information is present only one of the new and old feature data (the N route in Step S42).

In Step S43, the modification detail classification unit 16 calculates the amount of increased or decreased volume due to the modification. Since the modification detail currently being processed has been recognized in Step S42 as a modification of a feature element that is present only one of the new feature data or the old feature data, it is apparent that the feature element has been added or deleted in the modification detail. However, for example, an addition of feature element is either addition of a feature element having a positive volume, such as a projection, or addition of a feature element having a negative volume, such as an opening. Although both are addition from the viewpoint of the feature element, it is more intuitive and natural that addition of an opening that is a feature element having a negative volume is deletion of the opening portion. For making more intuitive classification, the volume obtained in Step S43 is used.

In Step S44, the modification detail classification unit 16 determines whether the volume obtained in Step S43 is a positive or negative number, and classifies modification detail into "feature addition" (Step S45) when the volume is positive (the Y route Step S44). In contrast, the modification detail classification unit 16 classifies modification detail into "deletion" (Step S46) when the volume is negative (the N route Step S44). After the classification is completed, the modification detail classification unit 16 returns to the processing in Step S41, and continues the processing with the next modification detail.

In Step S42, it is determined that the information defining the feature element corresponding to the modification detail is present both in new feature data and old feature data (the Y route in Step S42), the modification detail classification unit 16 proceeds to the processing in Step S47.

In Step S47, the modification detail classification unit 16 checks whether the information defining the feature element corresponding to the modification detail is for the portion or for another feature element referenced to by that portion. More specifically, the modification detail classification unit 16 determines whether not the information to be processed is information related to a referenced portion. When the information is for a feature element (referenced element) referenced to by that portion (the Y route in Step S47), the modification detail classification unit 16 proceeds to the processing in Step S48 in which information defining the feature element of the referencing portion is obtained.

In Step S49, the modification detail classification unit 16 determines whether the type of information defining the feature element is the dimension defining the size or the shape of the feature element, or information defining the position of the feature element. The information determined in this step is information of the referencing feature element obtained in Step S48 when determined as a referenced feature element in Step S47, or is information currently being analyzed and classified when not determined as a referenced feature element in Step S47 (the N route in Step S47).

In Step S49, when the type of the information is determined as the dimension defining the size or the shape of the feature element ("dimension of feature element" route), the modification detail classification unit 16 proceeds to the processing in Step S50 in which the modification detail being analyzed is classified into "feature modification". On the other hand, when the type of the information is determined as the information defining the position of the feature ("position of feature element" route), the modification detail classification unit 16 proceeds to the processing in Step S51 in which the modification detail being analyzed is classified into "displacement". After the classification as described above is completed, the modification detail classification unit 16 returns to the processing in Step S41, and continues the processing with the next modification detail.

Once the analysis and classification processing of modification details in Step S28 is completed as described above, and it is determined in Step S25 that the processing on all of the modified portions is completed (the N route in Step S25), the processing apparatus 1*a* proceeds to the processing in Step S29. In Step S29, the processing apparatus 1*a* (the difference expression construction unit 17) establishes difference expression data, in accordance with the classification result obtained in Step S28.

In this step, the difference expression data is generated for each modification type and modified portion, using animation, usage of different colors/highlighting, superimposition of features, and the like. Such difference expression data can be easily established from the new feature data and old feature data obtained in Steps S21 and S22, respectively, using any of existing CAD techniques or existing CG techniques. Specifics method for establishing the difference expression data are not limited to the examples described above.

Concrete examples of a difference expression will be described with reference to FIG. 11 to FIG. 13.

FIG. 11 is a diagram illustrating an example of a difference expression upon "feature addition". As depicted in FIG. 11, when the modification type is "feature addition", animation data showing the added feature (see reference symbol 101 in FIG. 14B) moving from the outside of the feature data toward the added position may be generated as difference expression data, for example (see the outlined arrow in FIG. 11).

FIG. 12 is a diagram illustrating an example of a difference expression upon "feature deletion". As depicted in FIG. 12, when the modification type is "deletion", animation data showing the deleted feature (see reference symbol 102 in FIG. 14A) moving toward the outside of the feature data and then disappearing may be generated as difference expression data, for example (see the outlined arrow in FIG. 12). Although it has been described that considering deletion of the key opening 102 as an addition of an object filling the key opening 102 is preferable, a difference expression considering deletion of the key opening 102 as "deletion" is defined in FIG. 12.

When the modification type is "feature modification", for the modified portion, image data in which the pictures before and after the modification, i.e., the new feature data and the old feature data, are superimposed while the feature modified portion, i.e., the different portion, is being highlighted may be generated as difference expression data, for example. For highlight display in this example, the color or brightness of the feature modification portion is changed. In addition, when the width dimension is modified for the key opening 103 and 103', as depicted in FIG. 4A and FIG. 4B, for example, animation data that changes the key opening feature to that size may be generated as difference expression data.

Figure 13:
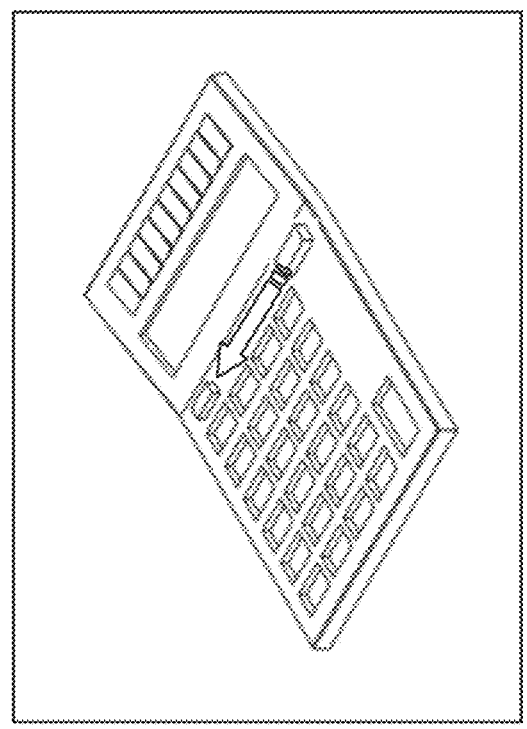
FIG. 13 is a diagram illustrating an example of a difference expression upon a displacement.

FIG. 13 is a diagram illustrating an example of a difference expression upon "displacement". As depicted in FIG. 13, when the modification type is "displacement" and when the displaced distance exceeds a certain threshold, animation data showing a picture (see reference symbols 104 and 104' in FIGS. 5A and 5B, and FIGS. 14A and 14B) is displaced from position before the move to the position after the move is generated as difference expression data (see the outlined arrow in FIG. 13), for example. In contrast, when the displaced distance does not exceed the threshold, animation data showing a picture being displaced beyond the threshold and then moved to a correct displacement position is generated as difference expression data.

The difference expression data 22 defined in this manner in Step S29 is stored into the primary storage apparatus 1c. In Step S30, the difference display unit 18 reads the difference expression data 22 from the primary storage apparatus 1c, and displays the read data on the display 1e, as information on the modified portion, to a certain designer identified by the ID.

Note that display functions of typical computer systems, such as pictures or animations, can be used for the processing of the display. In addition, the example of difference expressions described here are merely one example, and a particular method for expressing differences are not limited to the example presented herein. Furthermore, the method for displaying difference expressions are not limited to the display method presented therein.

(3) Advantageous Effects of Design Assistance Apparatus of the Present Embodiment In accordance with the design assistance apparatus 1 of the present embodiment, a portion to which a significant reference was made by the designer is identified by the referenced portion identification unit 11 during a normal design task by a designer. Then, the identification information that can be used to identify the referenced portion is accumulated into the referenced portion database 12 while being associated with the ID of the designer who made that reference. Thereafter, upon displaying the portion which underwent the design modification (difference presentation), the referencing determination unit 14 determines whether a significant reference was made to the modified portion identified by the modified portion identification unit 13, by making a search on the referenced portion database 12. Then, a difference presentation is made on the display 1d only for the modified portion that underwent a significant reference.

In other words, only the portion that is required to be referenced to and checked by the designer is displayed as a difference, and other portions are displayed as usual, without being displayed as differences. Accordingly, only the portion which requires check of the modification detail is presented to the designer as a difference, and other modified portions that do not require any check are displayed as usual after the modification. Thus, only portions to be checked by the designer are selected from multitude of modified portions, which facilitates check of modification details.

In addition, in accordance with the design assistance apparatus 1 of the present embodiment, modification details are classified into several modification types by the modification detail classification unit 16, and difference expression data in accordance with the modification types is established y the difference expression construction unit 17. Since this allows differences (modification details) to be displayed intuitively for the designer according to the modification types, the designer can easily recognize modification details of modifications that were made by other designers. In other words, the designer can easily recognize which parts have been modified and how they have been modified at a glance.

As described above, in accordance with the design assistance apparatus 1 of the present embodiment, modification details can be presented in a manner that can be easily recognized by the user, and it is ensured that each user can easily and reliably recognize modified portions and modification details made by other designers. This allows each user to easily identify required difference information from a lot of differences, and the user can easily check the effects of modifications made by the other designers. Accordingly, it is ensured that any failure caused by overlook of a modification that requires check by the user can be prevented, and any discrepancies at the boundary portions between designers that traditionally caused during a design task involving multiple designers.

(4) Others

While preferred embodiments of the invention have been described in detailed above, it should be understood that these are exemplary of the invention and are not to be considered as limiting. Any modifications and variations can be made without departing from the sprit of the invention.

In addition, the functions (a part or all of the functions) as the referenced portion identification unit 11, the referenced portion accumulation unit 12, the modified portion identification unit 13, the referencing determination unit 14, the modification detail obtainment unit 15, the modification detail classification unit 16, the difference expression construction unit 17, and the difference display unit 18 that have been described above may be embodied by a computer (including a CPU, an information processing apparatus, various types of terminals) executing a predetermined application program (design assistance program).

Such a program is provided inn the form of a record on computer readable storage medium, for example, a flexible disk, CDs (such as a CD-ROM, CD-R, a CD-RW), DVDs (such as a DVD-ROM, a DVD-RAM, a DVD-R, a DVD-RW, a DVD+R, a DVD+RW), and Blu-ray disks. In this case, the computer reads the program from that storage medium and uses that program after transferring it to the internal storage apparatus or external storage apparatus or the like.

Here, the term "computer" may be a concept including hardware and an OS (operating system), and may refer to hardware that operates under the control of the OS. Alternatively, when an application program alone can make the hardware to be operated without requiring an OS, the hardware itself may represent a computer. The hardware may include, at least a microprocessor, such as a CPU, and device to read a computer program stored on a storage medium. The application program as the above-described update information obtainment program includes program codes for making the computer to embody the function of the units 11 to 18. In addition, a part of the functions may be embodied by the OS, rather than the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:
1. A design assistance apparatus comprising:
a referenced portion identification unit that monitors an operation mode during a modification operation of feature data, determines whether or not the operation mode monitored is a predetermined reference mode, and, when it is determined that the operation mode is the predetermined reference mode, identifies a referenced portion to which a reference is made in the predetermined reference mode;

a referenced portion accumulation unit that accumulates the referenced portion identified by the referenced portion identification unit;

a modified portion identification unit that identifies a modified portion based on new and old feature data;

a referencing determination unit that determines whether a reference to the modified portion identified by the modified portion identification unit is made based on information accumulated in the referenced portion accumulation unit; and a difference display unit that displays, on a display, information related to the modified portion that is determined as having been referenced to by the referencing determination unit.

2. The design assistance apparatus according to claim 1, further comprising:

a modification detail obtainment unit that obtains, from the new and old feature data, a modification detail of the modified portion that is determined as having been referenced to by the referencing determination unit;

a modification detail classification unit that classifies the modification detail obtained by the modification detail obtainment unit into one of a plurality of modification types;

a difference expression construction unit that constructs a difference expression of the modified portion based on a classification result obtained by the modification detail classification unit and the new and old feature date, wherein the difference display unit displays, on the display, the difference expression constructed by the difference expression construction unit as the information related to the modified portion.

3. The design assistance apparatus according to claim 2, wherein the plurality of modification types include an addition, a deletion, a feature modification, and a displacement, and the modification detail classification unit classifies the modification detail into one modification type of the addition, the deletion, the feature modification, and the displacement.

4. The design assistance apparatus according to claim 2, wherein the difference expression construction unit constructs the difference expression of the modified portion in accordance with the modification type classified by the modification detail classification unit.

5. The design assistance apparatus according to claim 1, wherein the referenced portion identification unit identifies a portion to which a significant reference is made by a user during the modification operation of the feature data as the referenced portion.

6. The design assistance apparatus according to claim 5, wherein the significant reference is a reference that is expected to require a review by the user when the portion referenced is modified.

7. The design assistance apparatus according to claim 1, wherein the referenced portion identification unit obtains an identification information of the referenced portion, the referenced portion accumulation unit accumulates the identification information of the referenced portion identified by the referenced portion identification unit by relating to an identification information of the user referencing the referenced portion, and the difference display unit displays, on the display, the information related to the modified portion for each user identified by the identification information of the user.

8. A non-transitory computer-readable recording medium having a design assistance program stored thereon, the program making a computer function as:

a referenced portion identification unit that monitors an operation mode during a modification operation of feature data, determines whether or not the operation mode monitored is a predetermined reference mode, and, when it is determined that the operation mode is the predetermined reference mode, identifies a referenced portion to which a reference is made in the predetermined reference mode;

a referenced portion accumulation unit that accumulates the referenced portion identified by the referenced portion identification unit;

a modified portion identification unit that identifies a modified portion based on new and old feature data;

a referencing determination unit that determines whether a reference to the modified portion identified by the modified portion identification unit is made based on information accumulated in the referenced portion accumulation unit; and a difference display unit that displays, on a display, information related to the modified portion that is determined as having been referenced to by the referencing determination unit.

9. The non-transitory computer-readable recording medium according to claim 8 having a design assistance program stored thereon, the program making a computer further function as:

a modification detail obtainment unit that obtains, from the new and old feature data, a modification detail of the modified portion that is determined as having been referenced to by the referencing determination unit;

a modification detail classification unit that classifies the modification detail obtained by the modification detail obtainment unit into one of a plurality of modification types;

a difference expression construction unit that constructs a difference expression of the modified portion, in accordance with the modification type classified by the modification detail classification unit, based on a classification result obtained by the modification detail classification unit and the new and old feature data, wherein the programs further makes the computer function such that the difference display unit displays, on the display, the difference expression constructed by the difference expression construction unit as the information related to the modified portion.

10. The non-transitory computer-readable recording medium according to claim 9 having a design assistance program stored thereon, wherein the plurality of modification types include an addition, a deletion, a feature modification, and a displacement, and the program makes the computer function such that the modification detail classification unit classifies the modification detail into one modification type of the addition, the deletion, the feature modification, and the displacement.

11. The non-transitory computer-readable recording medium according to claim 9 having a design assistance program stored thereon, wherein the programs further makes the computer function such that the difference expression construction unit constructs the difference expression of the modified portion in accordance with the modification type classified by the modification detail classification unit.

12. The non-transitory computer-readable recording medium according to claim 8 having a design assistance program stored thereon, wherein the programs further makes the computer function such that the referenced portion identification unit identifies a portion to which a significant reference is made by a user during the modification operation of the feature data as the referenced portion.

13. The non-transitory computer-readable recording medium according to claim 12 having a design assistance program stored thereon, wherein the significant reference is a reference that is expected to require a review by the user when the portion referenced is modified.

14. The non-transitory computer-readable recording medium according to claim 8 having a design assistance program stored thereon, wherein the programs further makes the computer function such that the referenced portion identification unit obtains an identification information of the referenced portion, the referenced portion accumulation unit accumulates the identification information of the referenced portion identified by the referenced portion identification unit by relating to an identification information of the user referencing the referenced portion, and the difference display unit displays, on the display, the information related to the modified portion for each user identified by the identification information of the user.

* * * * *